Sept. 25, 1928.
H. R. HUGHES
1,685,325
TIRE DEFLATION SIGNAL
Filed July 19, 1927
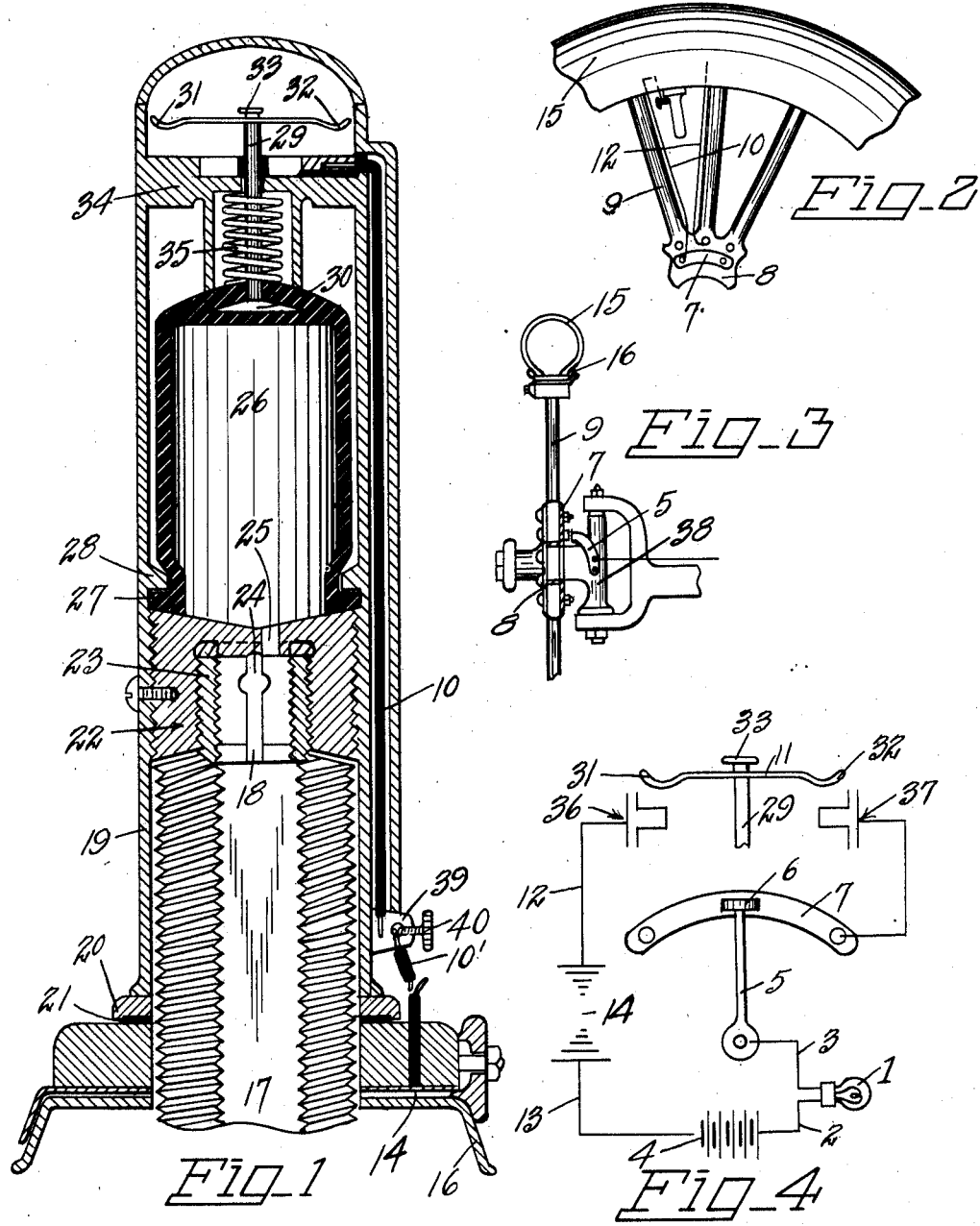
Inventor
Hugh R. Hughes
By Herbert E. Smith
Attorney Patented Sept. 25, 1928.

1,685,325

UNITED STATES PATENT OFFICE.

HUGH R. HUGHES, OF KELLOGG, IDAHO, ASSIGNOR OF ONE-FOURTH TO DENNIS R. FROST, ONE-FOURTH TO HARRY A. MUTCH, AND ONE-FOURTH TO HARREY J. PAPINEAU, ALL OF KELLOGG, IDAHO.

TIRE DEFLATION SIGNAL.

Application filed July 19, 1927. Serial No. 206,847.

My present invention relates to improvements in tire deflation signals and is designed for application to and use with the wheels having pneumatic tires and used upon automotive vehicles.

The primary object of the invention is to provide a signal, which in this instance, is an electric lamp located on the dashboard or instrument board of the automobile, which is illuminated when the tire of the wheel is deflated or at an undesirable low pressure.

The invention consists in certain novel combinations and arrangements of parts that are carried in a valve cap which is applied to the usual valve stem carried by automobile wheels, as will be hereinafter more particularly pointed out and claimed.

In carrying out my invention, I utilize an air equalizing reservoir located within the valve cap, and an electric circuit maker which is normally open, is also carried in the cap, and becomes operative or closed upon deflation of the tire and a correspondingly low pressure in the equalizing reservoir.

In the accompanying drawings, I have illustrated one complete example of the physical embodiment of my invention wherein the parts are combined and arranged according to the best mode I have so far devised for the practical application of the principles of my invention.

Figure 1 is a sectional view showing a portion of a wheel rim, and the device of my invention applied thereto;

Fig. 2 is a detail view of a portion of a wheel showing the device in position and a hub plate electrically connected thereto;

Fig. 3 is a sectional view of a wheel showing a brush holder supported on the spindle part of the axle of the wheel; and Fig. 4 is a diagrammatic view of the signal circuit.

In the diagrammatic view of Fig. 4, the electric lamp 1 is located on the dashboard or instrument board where it may readily be seen by the driver of the automobile, and this lamp is provided with the usual wires 2 and 3, and a source of energy, as the battery 4. The circuit includes a brush holder 5 which is provided with a roller 6 that coacts with a rotating element or hub plate 7 which is secured to the hub 8 of the wheel 9. This hub plate is shown with wire 10 that leads to the circuit maker which is indicated in Fig. 4 as a whole by the numeral 11, and the lighting or signal circuit includes wires 12 and 13 grounded at 14.

The tire 15 may be the standard or balloon type and is fitted on usual felly or rim 16, and the spokes of the wheel are indicated as 9. The usual hollow valve stem for the tire is indicated by the numeral 17 and this hollow stem has therein the valve pin 18 of usual construction and shown in Fig. 1. The valve cap 19 is screwed onto the hollow valve stem as usual, and the usual washer 20 is also provided and insulated at 21 from the rim. Within the valve cap and some distance from its end, is located and fixed a hollow threaded head 22 which screws on the boss 23 on the end of the valve stem 17. This hollow head has a central socket 24 that receives and engages the end of the valve pin 18, and unseats the valve to permit air pressure from the tire to pass through the hollow valve stem and also through a passage 25 in the head 22.

Within the valve cap is located a rubber bag or reservoir 26, with its lower open end closed by the head 22, and this reservoir forms an equalizing chamber to which the air pressure extends through the passage 25 from the interior of the tire. At its lower end the reservoir is fashioned with an exterior flange 27 that coacts with a complementary flange 28 on the interior of the cap, to retain the reservoir in place. Thus if air pressure at thirty pounds is introduced to the tire, when the cap is screwed on the stem 17, the pressure is allowed to extend into the reservoir or equalizing chamber. The pressure in this chamber is utilized for holding open the circuit maker 11, and when this pressure falls to a certain point, the circuit maker 11 is closed.

The circuit maker includes a plunger rod 29 having a head 30 fixed within the head of the air equalizing chamber, and two contact members 31 and 32 are provided at the ends of a cross bar 11 retained loosely by pin 33 on the plunger rod 29. The rod is reciprocable in a hollow guide head 34 near the closed end of the valve cap, and this guide head has a central recess for a spring 35 which normally holds the plunger rod 29 in the position of Fig. 1 with the movable contact members 31 and 32 in open position. The stationary contact members of the circuit maker are indicated at 36 and 37 and they are in position for frictional contact by the movable contact members 31 and 32 when the spring 35 actuates the plunger. Thus if the spring is set to expand under twenty-eight pounds pressure, and the pressure in the equalizing chamber is reduced from thirty pounds to twenty-eight pounds or less, it will be seen that the spring becomes effective and moves the plunger rod 29 to close contact between the members 31—36 and 32—27, thus closing the lamp circuit to illuminate the lamp 1.

The brush holder 5 is supported on the steering knuckle 38, and the contact roller 6 is carried at the end of the holder, for the purpose of contacting with electrical plate 7 carried by the hub 8. The wire 10 as seen in Fig. 1 is detachably connected to a perforated lug 39 of the cap and a clamp screw 40 holds the end in place. When the cap is to be removed the screw is first loosened to permit detachment of the end 10' of the wire 10. Thus as the wheel rotates, an intermittent contact is established between the roller 6 and the electrical plate 7. When the pressure in the tire is deflated to a certain degree, it will be seen that the lamp 1 is intermittently illuminated, and becomes a flash lamp. Thus as the wheel revolves, the electrical plate 7 intermittently contacts with the roller 6 and the successive flashes of the lamp result from this frictional and electrical contact between the rotating wheel and the non-rotary brush holder. The illumination of the lamp of course is a signal to the driver of the car or other person to indicate the dangerous condition of the deflated tire. Of course, it will be understood that the several wheels of the automobile will be equipped with the devices of my invention, and inasmuch as each one operates in a similar manner, a description of one will suffice for all that are used.

Having thus fully described my invention, what I claim as new and desire to secure by Letters Patent is—

The combination with a valve stem and its valve pin, of a valve cap adapted to be threaded on the stem, means carried by the cap for opening the tire valve, said cap having an inflatable reservoir forming an equalizing air pressure chamber to receive pressure from the tire, an exterior retaining flange on the reservoir and a coacting interior flange on the valve cap, a normally open circuit maker carried in the cap, and means operable to close the circuit when the pressure in the reservoir falls to a certain degree.

In testimony whereof I affix my signature.

HUGH R. HUGHES.